United States Patent
Stark et al.

(10) Patent No.: US 6,963,535 B2
(45) Date of Patent: Nov. 8, 2005

(54) MAC BUS INTERFACE

(75) Inventors: Gavin J. Stark, Fremont, CA (US); John Wishneusky, Fitzwilliam, NH (US)

(73) Assignee: Intel Corporation, Santa Clara, CA (US)

( * ) Notice: Subject to any disclaimer, the term of this patent is extended or adjusted under 35 U.S.C. 154(b) by 962 days.

(21) Appl. No.: 09/751,936

(22) Filed: Dec. 28, 2000

(65) Prior Publication Data

US 2002/0126693 A1 Sep. 12, 2002

(51) Int. Cl.$^7$ .............................................. H04L 12/26
(52) U.S. Cl. ...................... 370/230; 370/463; 709/250
(58) Field of Search .............................. 370/230, 400, 370/410, 420, 419, 463, 468, 389, 469, 412; 709/250, 229; 714/38, 45

(56) References Cited

U.S. PATENT DOCUMENTS

| | | | |
|---|---|---|---|
| 5,058,114 A | * 10/1991 | Kuboki et al. | 714/38 |
| 5,459,720 A | * 10/1995 | Iliev et al. | 370/468 |
| 6,424,659 B2 | * 7/2002 | Viswanadham et al. | 370/389 |
| 6,651,107 B1 | * 11/2003 | Conley et al. | 370/419 |
| 6,754,222 B1 | * 6/2004 | Joung et al. | 370/412 |

* cited by examiner

Primary Examiner—Duc Ho
Assistant Examiner—Phuongchau Ba Nguyen
(74) Attorney, Agent, or Firm—Blakely, Sokoloff, Taylor & Zafman LLP

(57) ABSTRACT

A Media Access Control (MAC) Bus interface definition and multiplexor scheme that may be implemented to provide chip layout-insensitive connections between a number of communication physical layer port entities and a single buffer manager or communications controller entity, utilizing a set of independent pipelined buses. The interface comprising three buses: A MAC In Data bus, a MAC Out Data bus, and a MAC Out Message bus. Each bus can operated with an independent set of timing signals to enable data transfers between a system side block and one or more network side blocks. The multiplexor scheme provides a multiplexor for each of the MAC buses, and enables a single system side block to connect to multiple network side blocks. The multiplexors may be also be cascaded.

22 Claims, 11 Drawing Sheets

DATA PACKET HEADER WORD

REQUEST MESSAGE WORD transaction = IdleIn*
room-next = empty + xfr
room = reg1full* + reg2full + xfr
full = reg1full x reg2full
empty = reg1full* x reg2full* transaction = IdleIn*
room-next = empty + xfrA + xfrB
room = reg1full* + reg2full* + xfrA + xfrB
full = reg1full x reg2full
empty = reg1full* x reg2full*

Message transfers are one word long
merquest = awaitA = awaitB
selA = awaitA mxfr machines for A and B network side input port

MAC BUS INTERFACE

BACKGROUND OF THE INVENTION

1. Field of the Invention

The present invention generally concerns communications interfaces, and in more particular concerns a scheme for interfacing a plurality of MAC interfaces to a single communications controller.

2. Background Information

The problem of interconnecting a number of physical (layer 1) or Media Access Control (MAC) (layer 2) communications interfaces to a single communications controller has been around for years. A number of standard interfaces have been developed to address this problem. These include Utopia1, Utopia2, and Utopia 3 (for ATM systems), and MII and RMII for IEEE802.3 systems. These systems tend to be physical layer or MAC layer dependent, and not well suited to route interfaces onboard an ASIC. For example, the Utopia interfaces only work for ATM cells, and use tristate buses. In addition, the RMII and MII interfaces do not multiplex data for many channels over a single set of wires, but require separate wires for each channel.

Because of these limitations, many ASIC designs that incorporate communications interfaces have tended to include internal ASIC buses with an address and a data bus and DMA (direct memory access) to supply the required functionality. The designs have then become very focused on the particular communications physical or MAC layer that is being utilized, and they have not been generally applicable to the breadth of communications interfaces that the industry uses. This leads to poor reusability of designs, and due to the tight coupling between the DMA engine and the communications interface, the ASIC design process leads to interdependencies between the two, such as routing sensitivity.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION

The present invention comprises a MAC Bus interface definition and multiplexor scheme that may be implemented to provide chip layout-insensitive connections between a number of communication physical layer port entities and a single buffer manager or communications controller entity, utilizing a set of independent pipelined buses.

Figure 1:
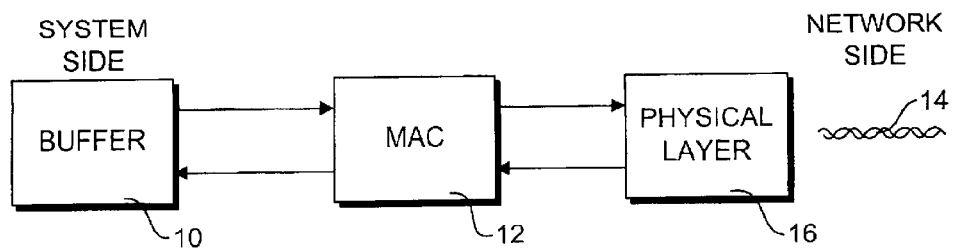
FIG. 1 is a high-level schematic block diagram illustrating communication between a system side and a network side via a MAC layer and a physical layer.

FIG. 1 shows a high level view of a typical network communications interface scheme. Data passing to and from the system side is stored in a buffer 10. In order to meet a particular networks message handling requirements for the network, outbound data is sent to a MAC layer 12, which controls access to a network 14 through a physical layer 16. MAC layer 12 is also used to control access to inbound data from network 14.

Under the IEEE 802 communications standard, the MAC layer comprises one of the two sublayers in the data link layer. The MAC layer controls the means by which multiple devices share the same media channel. The MAC layer also provides addressing information for communications between network devices.

Figure 2:
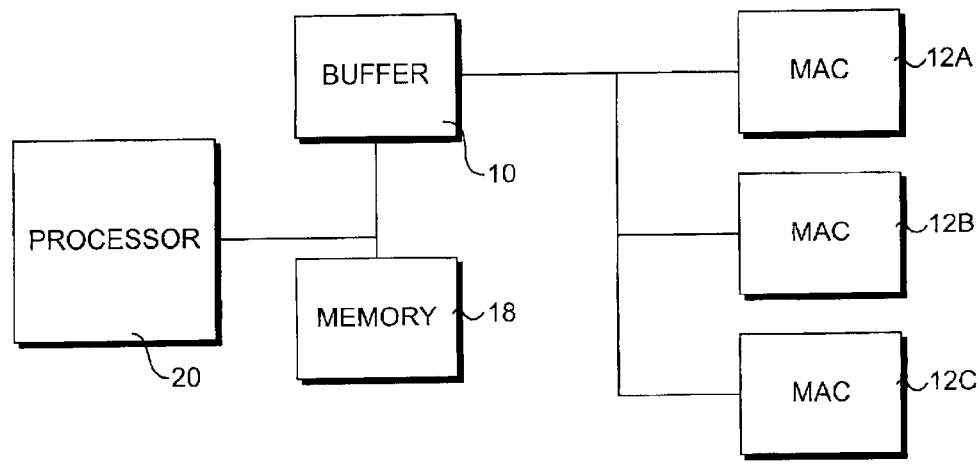
FIG. 2 is a schematic block diagram of an exemplary configuration that includes a plurality of MAC interfaces in accord with the present invention.

FIG. 2 illustrates a configuration in which buffer 10 is connected to several MAC layer interfaces 12A, 12B, and 12C. As depicted in the Figure, buffer 10 is also connected to a memory 18 and a processor 20 that enables execution of an application program accessing the network.

Figure 3:
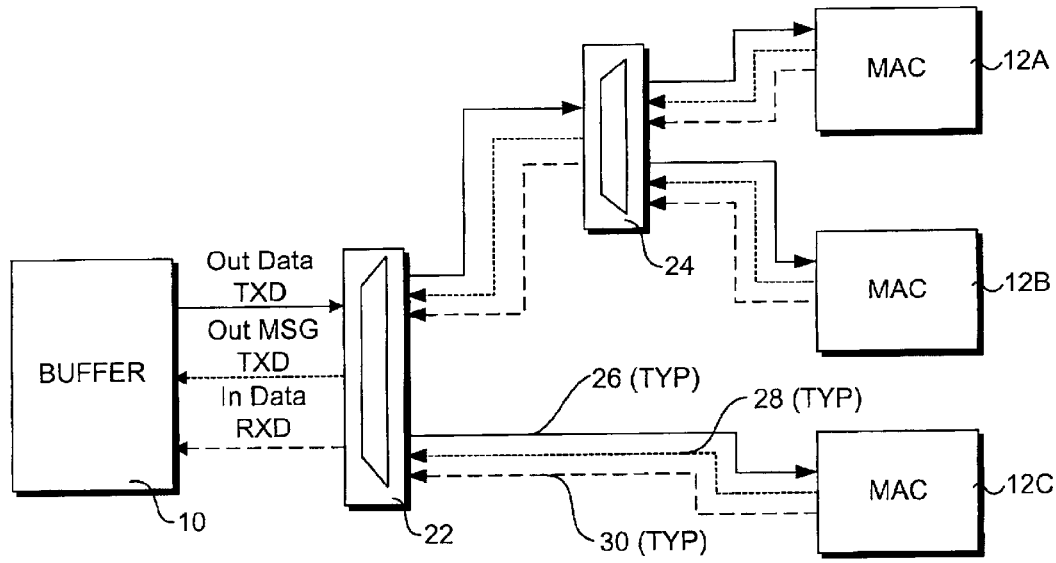
FIG. 3 is a schematic block diagram illustrating a cascaded pair of MAC bus multiplexors that enable the configuration in FIG. 2 to operate.

FIG. 3 illustrates further details of the FIG. 2 configuration in which connections to the multiple MAC layer interfaces are facilitated by a pair of MAC bus multiplexors (MUXs) 22 and 24 that control the flow of data and handshaking signals flowing across The MAC bus. In addition, the Figure illustrates the three separate bus components that make up the MAC bus interface, including MAC Out data busses 26, MAC Out message busses 28, and a MAC In data busses 30. Accordingly, as described below, each of MAC bus MUXs 22 and 24 comprise three logically separate bus multiplexors.

The MAC Bus is an intra-chip interface bus definition for unidirectional, synchronous, point-to-point data packet transfers. Its function is to support the transfer of data packets between functional blocks in communications products. Its purpose is to permit efficient movement of data associated with multiple channels and ports between media interface blocks, protocol-processing blocks, fifo management blocks and buffer management blocks. Blocks communicating across a MAC Bus interface may assume or impose additional formatting rules beyond those defined in the following definition on the data within the data packet transfers to suit the nature of their communications and processing functions.

There is a directional context for the MAC Bus interfaces. Data is viewed to be passing across an interface where one side is closer to the network connection and the other side is closer to the local system interface. In accordance with this view, the two sides of the interface are called "System" side and "Network" side. Further, the terminology used herein describes data movement in terms of data moving In from or Out to the Network. Therefore, a MAC Bus interface that moves data from a System side block to Network side block is termed a MAC Bus Out connection. The reverse interface, from a Network side block to System side block, is termed a MAC Bus In connection.

The handshake signal definitions used in both the MAC Bus In and Out interfaces are identical, so it is also appropriate to speak of the sending side and the receiving side of the interface. The sending side always initiates data packet transfers by asserting data and a corresponding transfer request signal. The receiving side controls the actual transfers by asserting its xfr (transfer) signal during cycles when it latches data from the sending side. Both sides have the ability to introduce wait states so that the implementation of blocks may accommodate shared access to common buses or buffer memory in their implementation of a MAC Bus interface. The internal design of blocks using MAC Bus interfaces should be such that clock cycles lost to wait states represent a minority of available cycles. Single wait states should be sufficient to permit resource sharing.

The Network side is responsible for the rate and quantity of data transfer, and also for the order of channel or port transfers that may be required to pass across an interface. As a result, the MAC Bus In interface may simply comprise a data bus and handshake signals with all requests for data transfer originating from the Network side. The design of the blocks passing data across a MAC Bus In interface should guarantee that all data transfers requested by the Network side will be accepted and completed by the System side.

The MAC Bus Out connection supports data flow from System side blocks to the Network side blocks. As the Network must determine the general timing and order of transfers, the MAC Bus Out interface must include both a forward data transfer interface and a reverse request message interface by which the network side can indicate the order and size of data transfers it requires. The reverse request message interface is similar to the forward data transfer interfaces of the In and Out connections except that it is limited to one word transfers. Those words correspond closely with the packet header words of the data transfer interfaces.

All data and handshake signals change synchronously at the end/beginning of a clock cycle. Signals need only propagate across the interface wiring from one side to the other to be latched or sampled at the end of the clock cycle with allowance for limited multiplexing and combinatorial logic in the signal path at the interfaces. Each MAC Bus interface data transfer is initiated by the sending side with the assertion of the request signal together with presentation of the packet header word on the data bus. When the receiving side recognizes the request and is prepared to take the data, it asserts a xfr signal at the start of the clock cycle. The receiving side then latches data at the end of the cycle and expects the sending side to present new data for transfer on the following cycle. If the sending side is unable to present new data at the end of the current clock cycle, it must assert hold during the cycle. If the receiving side detects that hold is true at the end of a xfr cycle, it must not perform another xfr until it detects that hold is false at the end of a subsequent clock cycle. If the receiving side is unable to perform a transfer in the current cycle it merely withholds xfr for the cycle.

The receiving side knows that the current transfer is the last word in the packet when request is false at the end of the cycle. It is not necessary for logic in the receiving side interface to interpret the length field of the packet header word. The sending side will remove its request at the end of the xfr cycle that transfers the next to last word of the data packet.

The MAC Bus interface definition is intended to perform simple multiplexing configurations with, for example, multiple interfaces on the Network side connected to a single interface on the System side by use of MAC Bus Multiplexors. To aid in solving chip layout and routing problems, these Multiplexors may be cascaded. Data is always presented together with a new request so that the routing information in the packet header word (the port and channel fields) is present if needed by the receiving interface. The routing information will be used by a MAC Bus Mux to determine on which sending side interface it should assert a request to transfer the data. Intermediate MAC Bus Multiplexors that have multiple sending side interfaces may use the routing data to avoid driving data on interfaces not selected by the routing data.

The MAC Bus interface signals and Header and Message word formats are shown in the following tables.

MAC Bus In data packet bus

| Signal | Source | |
|---|---|---|
| request | network | Asserted to request transfer of data packet, removed at end of xfr cycle that transfers next to last word. |
| hold | network | Asserted during a cycle to indicate that network will not be able to update data output at end of current cycle, this will introduce a wait state on the next cycle if the system performs a xfr while hold is asserted. |
| xfr | system | Signifies that the system is latching data word at the end of the current cycle. |
| data[31:0] | network | 32 bit data bus |

MAC Bus Out message back bus

| Signal | Source | |
|---|---|---|
| mrequest | network | Asserted to request transfer of request message from network side. |
| mxfr | system | Signifies that system is latching message word at the end of the current cycle. |
| mdata[31:0] | network | 32 bit request/message bus |

MAC Bus Out data packet forward bus

| Signal | Source | |
|---|---|---|
| request | network | Asserted to request transfer of data packet, removed at end of xfr cycle that transfers next to last word. |
| hold | network | Asserted during a cycle to indicate that system will not be able to update data output at end of current cycle, this will introduce a wait state on the next cycle if the network performs a xfr while hold is asserted. |
| xfr | system | Signifies that the network is latching data word at the end of the current cycle. |
| data[31:0] | network | 32 bit data bus |

Header word format

| 4 bits type | 6 bits flags | 6 bits length | 4 bits port | 12 bits channel |
|---|---|---|---|---|

Message word format

| 4 bits request | 6 bits reserved | 6 bits length | 4 bits port | 12 bits channel |
|---|---|---|---|---|

Figure 6:
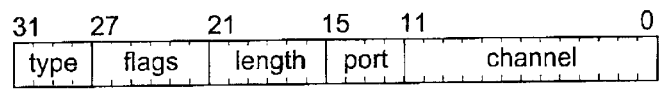
FIG. 6 is a data packet header word used when transferring data across the MAC bus interface.
Figure 7:
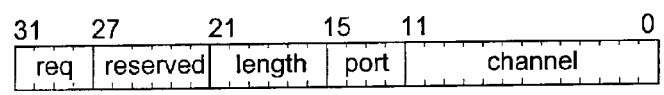
FIG. 7 is a request message word used when sending a message across the MAC bus interface.

Each packet transfer begins with a packet header word whose format is shown above and in FIG. 6. In addition, each message word has a format shown above and in FIG. 7. In each of these word formats, the flag field will indicate status and control information to be communicated with the packet. Examples are frame synchronization in T1 ports, frame status in HDLC processing and forced errors and abort in frame transmission. The definition of the flag bits will be dependant on the context of the blocks using the interface.

Figure 4:
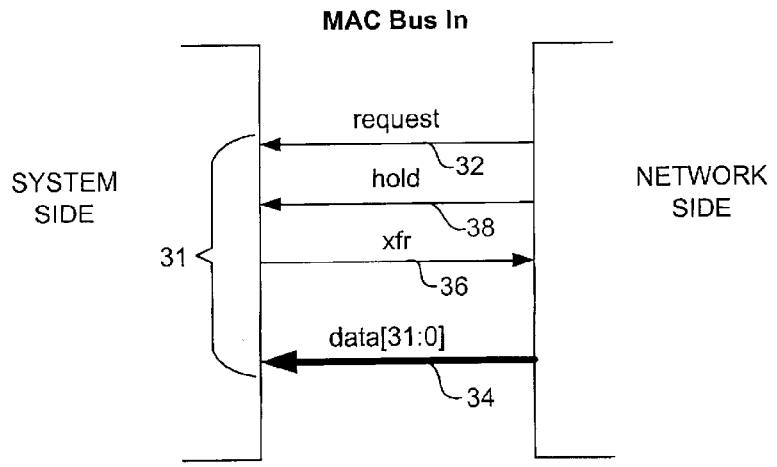
FIG. 4 is a schematic diagram illustrating the MAC Bus In communication signals corresponding to a transfer of data from a network side block to a system side block.

The set of communication signals comprising the MAC Bus In interface 31 is shown in FIG. 4. This interface supports sending data from the Network side to the System side. This operation is initiated by the Network side, which asserts a request signal 32 and data 34 comprising a data packet header word and one or more 32-bit data words. The System side then controls the transfer of data 34 by asserting a xfr signal 36 during cycles when it latches the data. If necessary, a hold signal 38 may be asserted by the Network side during a cycle to indicate that the Network side will not be able to update data 34 at the end of the current cycle, introducing a wait state on the next cycle if the System side performs a xfr signal 36 while hold signal 38 is asserted.

Figure 5:
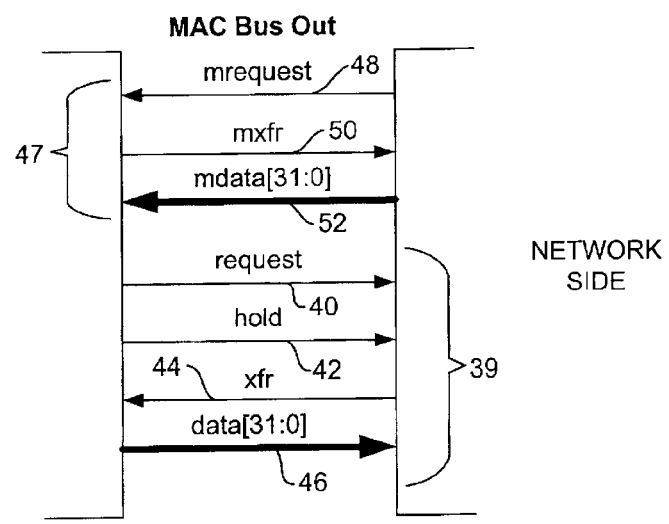
FIG. 5 is a schematic diagram illustrating the MAC Bus Out communication signals that enable a transfer of data from a system side block to a network side block and enable the network side block to send flow control information messages to the system side block.

The set of MAC Bus Out interface communication signals corresponding to sending data from the System side to the Network side is shown in FIG. 5. As discussed above, sending data out requires the Network side to determine the general timing and order of transfers. Accordingly, the Mac Bus Out interface includes a forward data transfer interface 39 comprising a request signal 40, a hold signal 42, a xfr signal 44, and data 46, as well as a reverse request message interface 41 comprising an mrequest signal 48, an mxfr signal 50, and an mdata message word 52. A data transfer out operation is initiated by the System side by asserting request signal 40 and data 42. The Network side then controls transfer of data 42 by asserting xfr signal 44. In a manner similar to MAC Bus In interface 31, hold signal 42 may be asserted by the System side during a cycle to indicate that the System side will not be able to update data 46 at the end of the current cycle, introducing a wait state on the next cycle if the System side performs a xfr signal 44 while hold signal 42 is asserted.

Further communications control is enabled through the data request messages passed from the Network side to the System side over reverse request message interface 41. These messages are passed in a manner substantially similar to that discussed above with respect to the MAC Bus In interface 31, except that the message data is moving in the opposite direction, and is limited to one word transfers (there is no equivalent to hold signal 38), wherein mrequest 48 is asserted to request transfer of a request message from the Network side while asserting a mdata message word 52 and mxfr signal 50 is asserted to indicate that the System side is latching mdata message word 52 at the end of the current cycle.

In order to simultaneously send data to and receive data from multiple network channels, one or more MAC Bus multiplexors are needed. Each MAC Bus multiplexor comprises three components: a MAC BUS In multiplexor, a MAC Bus Out Data multiplexor, and a MAC Bus Out Message multiplexor.

Figure 8:
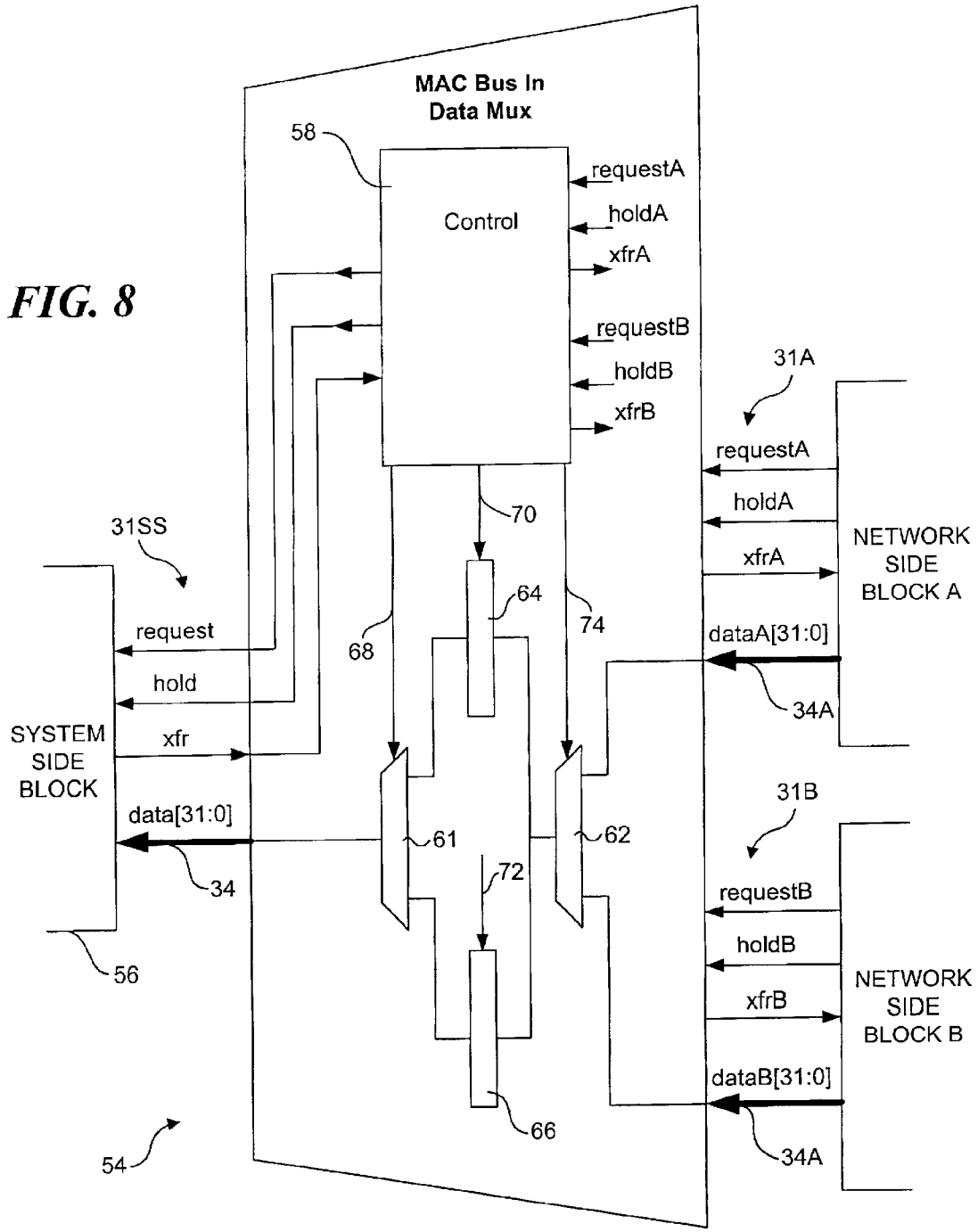
FIG. 8 is a schematic diagram of a MAC Bus In Data Multiplexor.

An exemplary MAC Bus In Data multiplexor (Mux) 54 is shown in FIG. 8. MAC Bus In Data Mux 54 provides two-to-one multiplexing to facilitate inbound communications between a System side block 56, and two Network side blocks A and B. Accordingly, the MAC Bus In interfaces between the Network side input ports and MAC Bus In Data Mux 54 are labeled "31A" (block A) and "31B" (block b), while the MAC Bus In interface between MAC Bus In Data Mux 54 and System side block 56 is labeled "31SS" (system side).

MAC Bus In Data Mux 54 includes a control 58, a pair of 32-bit multiplexors 61 and 62, and buffers 64 and 66. As described below, buffers 64 and 66 preferably comprise registers, although similar components used for temporarily holding data may also be used. Control 58 is used to control the multiplexing of the various signals received by and asserted from the Network side input ports and the System side block. Control 58 multiplexes request and hold signals received from Network side input ports A and B, and forwards these signals with appropriate timing to System side block 56. In addition, Control 58 receives xfr signals from System side block 56, and multiplexes these signals with appropriate timing to input ports of Network side blocks A and B.

In addition to controlling forwarding of the foregoing signals, control 58 controls the flow of data 34 across the interface by asserting data movement control signals 68, 70, 72, 74 to respectively control multiplexor 61, buffer 64, buffer 66, and multiplexor 62. The use of dual data buffers permits the sustained transfer of data packet words through the Mux from the Network side blocks to the System side block. The timing of the assertion of the data movement control signals and forwarding the request, hold and xfr signals is controlled by a corresponding state machine. State machine diagrams and a timing diagram corresponding to the configuration shown in FIG. 8 are respectively shown in FIGS. 12, 13, and 19.

Figure 9:
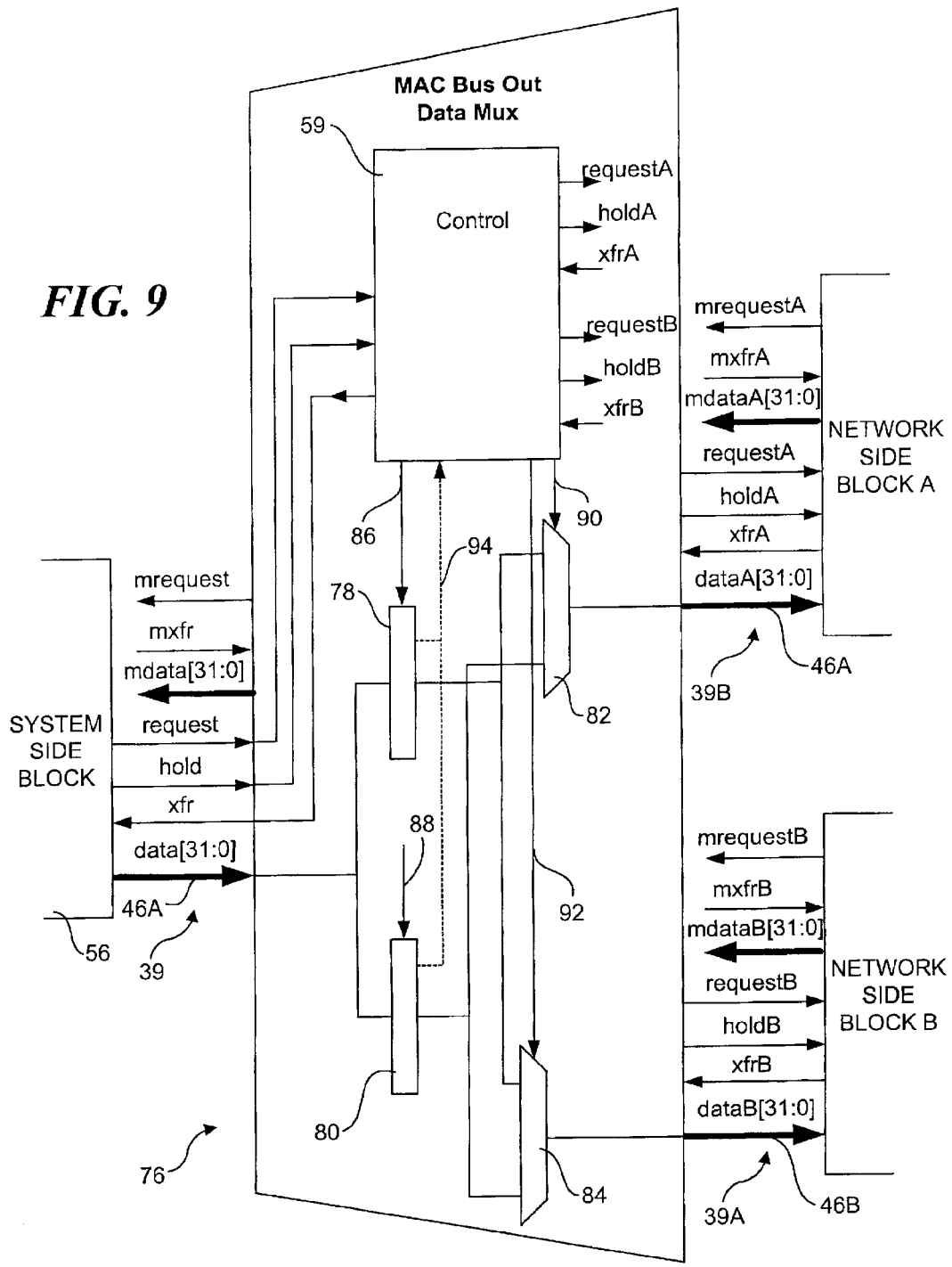
FIG. 9 is a schematic diagram of a MAC Bus Out Data Multiplexor.

An exemplary MAC Bus Out Data Mux 76 is shown in FIG. 9. MAC Bus Out Data Mux 76 comprises a pair of buffers 78 and 80, and a pair of multiplexors 82 and 84, that receive data movement control signals 86, 88, 90, and 92 from a control 59. Control 59 receives request and hold signals issued by System side Application 56, multiplexes these signals, and forwards them with appropriate timing to Network side block A and B, while receiving xfr signals from the Network side blocks and forwarding the xfr signals to System side block 56 with appropriate timing. Data 46 are sent from System side block 56 to Network side blocks A and B via buffers 78 and 80 and multiplexors 82 and 84. As with control 58, control 59 controls the delivery of the data words based on the handshaking signals it receives. In addition, routing data bits 94 are extracted from data headers words corresponding to data 46 in buffers 78 and 80, and provided to control 59 to enable the control to route data 46 to the appropriate System side input port. The use of dual data buffers in the Mux permit the sustained transfer of data packet words through the Mux from System side block 56 to the Network side blocks. State machine diagrams and a timing diagram corresponding to the Mux configuration shown in the FIG. 9 are respectively shown in FIGS. 15, 16, and 20.

Figure 10:
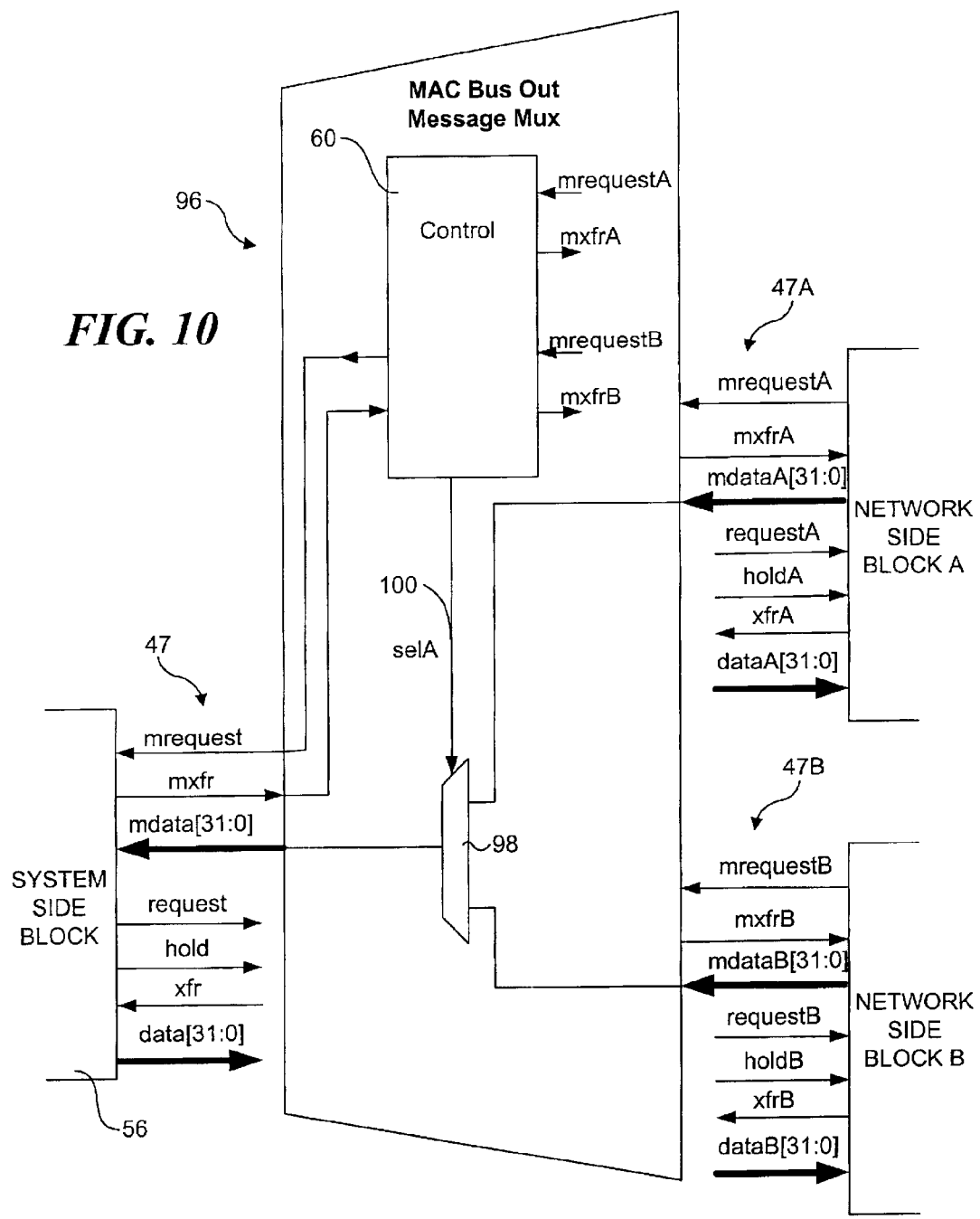
FIG. 10 is a schematic diagram of a MAC Bus Out Message Multiplexor.

FIG. 10 shows an exemplary MAC Bus Out Message Mux 96 that includes a single multiplexor 98, which is controlled by a control 60 via a "selA" control signal 100. Control 58 receives mrequestA and mrequestB signals 48A and 48B from the Network side blocks A and B, multiplexes the requests, and passes them on to System side block 56 with appropriate timing. Control 60 also receives mxfr signals from the System side block, multiplexes the signals, and deliverers the mxfr signals to Network side blocks A and B with appropriate timing.

MAC Bus Out Message Mux 96 relies on the Network side to hold mdata stable so that an additional data latch in the Mux is not needed. Data propagates from the Network side to the Mux in one cycle, and through the Mux to the System side during a subsequent cycle when the Mux asserts its mrequest signal to the System side interface. Once the System side mxfr is seen by the Mux, mxfr is presented to the Network side to confirm the message transfer.

In the foregoing discussion, each of Mac Bus In Data Mux 54, Mac Bus Out Data Mux 76, and MAC Bus Out Message Mux 96 comprise separate components. This configuration provides the benefit that each Mux may be operated with a separate clocking signal. Optionally, controls 58, 59, and 60 may comprise a single control that uses a single clocking signal for all three bus muxing functions.

Figure 11:
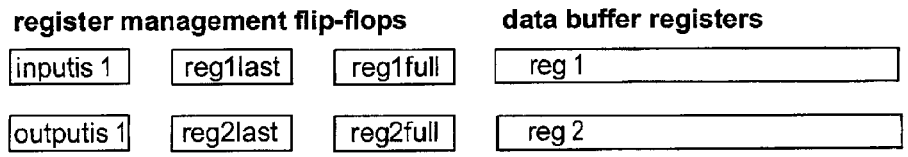
FIG. 11 shows a set of register management flip-flops and corresponding data buffer registers corresponding to the logic implemented by a MAC Bus In Data Multiplexor that interfaces to two network blocks.
Figure 12:
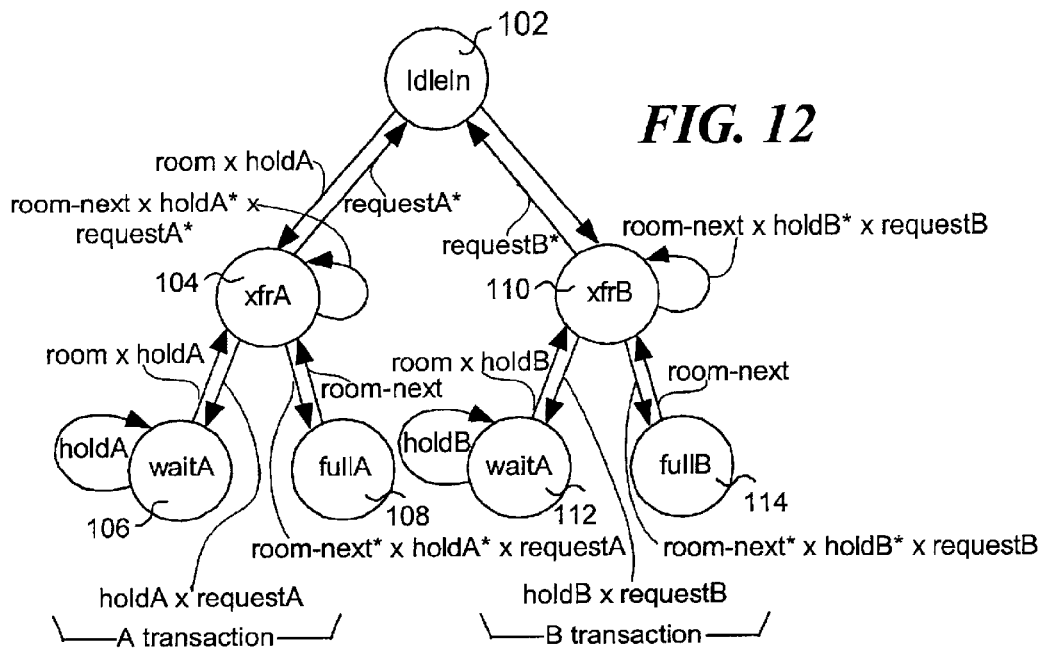
FIG. 12 is a state machine diagram corresponding to an xfr machine for a system side input port for a MAC Bus In Data Multiplexor that interfaces to two network blocks.
Figure 13:
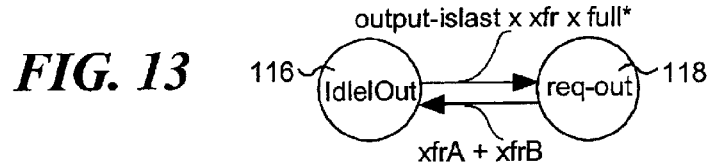
FIG. 13 is a state machine diagram for a request machine for network side output ports corresponding to a MAC Bus In Data Multiplexor that interfaces to two network blocks.

Logic for implementing Mac Bus In Data Mux 54 is now presented with reference to FIGS. 11, 12, and 13. FIG. 11 shows a set of register management flip-flops that may be used to implement the logic for controlling the data buffer registers (i.e., buffers 78 and 80). The reg#full bits are set when an xfrA or xfrB to the register takes place and are cleared when an xfr from the register takes place. The inputis 1 bit toggles on each xfrA or xfrB to either reg1 or reg2. The outputis 1 bit toggles on each xfr from either reg1 or reg2. The reg#last bits are set when the associated register is loaded within a transaction and the request input for the transaction is low. They are cleared when the output xfr from the register is completed.

FIG. 12 shows a machine state diagram corresponding to data transfers from Network side blocks A and B, wherein the states for each block are indicated by an appended "A" or "B." A legend for the various states is shown in the lower left-hand corner of the Figure. An IdleIn state 102 is shared by both transactions, wherein an input port A transaction further includes an xfrA state 104, a waitA state 106, and a fullA state 108, and an input port B transaction further includes an xfrB state 110, a waitB state 112, and a fullA state 114. Requests and hold signals that are issued to cause the machine to move to the next state are depicted adjacent to the arrows connecting each state. The state machine also includes recursive loops, as shown by nearly complete circles with an arrow on one end.

FIG. 13 depicts a request state machine for a System side block output port, which includes an IdleOut state 116 and a req-out state 118. "Output-islast" indicates the current output register's reglast bit. On the last xfr of a transaction, if both registers are full, the logic remains in req-out state 118, and another transaction is ready.

The hold output may be produced combinatorially from the state of the data buffers and the xfr machine as follows:

hold=(full+*xfrA*+*xfrB*)*

The value of hold is a don't care on the last xfr of a message. If hold delays the last xfr, it must go low for at least one cycle to permit it to occur.

Figure 14:
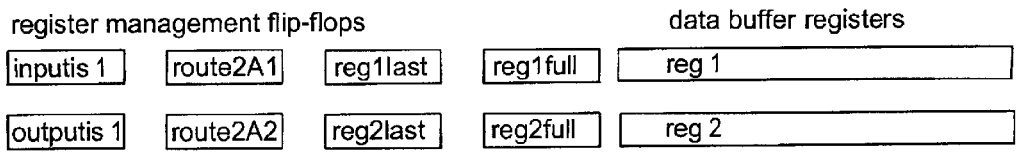
FIG. 14 shows a set of register management flip-flops and corresponding data buffer registers corresponding to the logic implemented by a MAC Bus Out Data Multiplexor that interfaces to two network blocks.
Figure 15:
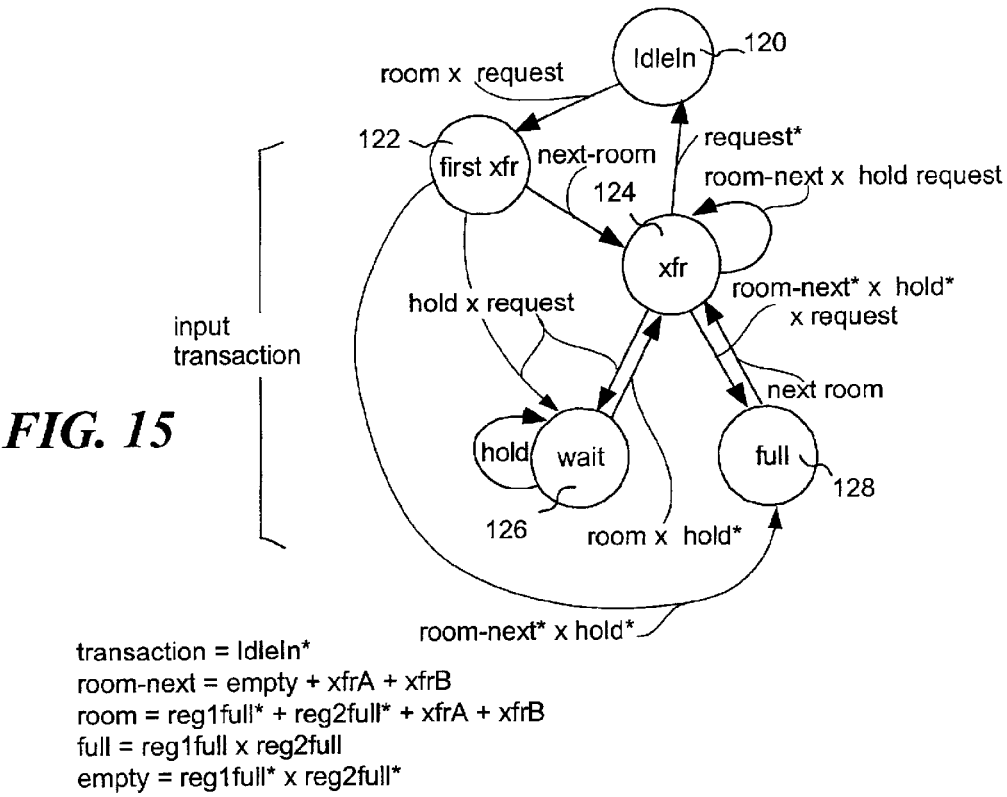
FIG. 15 is a state machine diagram for an xfr machine for a system side input port for a MAC Bus Out Data Multiplexor that interfaces to two network blocks.
Figure 16:
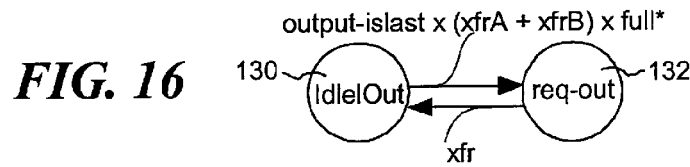
FIG. 16 is a state machine diagram for a request machine for network side output ports corresponding to a MAC Bus Out Data Multiplexor that interfaces to two network blocks.

FIGS. 14, 15, and 16 depict MAC Bus Out Data Mux logic. With respect to the register logic of FIG. 14, the reg#full bits are set when an xfr to the register takes place and are cleared when an xfrA or xfrB from the register occurs. The inputis 1 bit toggles on each xfr to either reg1 or reg2. The outputis 1 bit toggles on each xfrA or xfrB from either reg1 or reg2. The register's route2A is loaded based on routing information in the message header during a first-xfr. For other xfr's, the inputis register's route2A bit receives the other register's route2A value. The reg#last bits are set when the associated register is loaded within a transaction and the request input for the transaction is low. They are cleared when the output xfr for the register is completed.

A xfr state machine for a System side input port is shown in FIG. 15. The states include an IdleIn state 120, a first xfr state 122, and xfr state 124, a wait state 126, and a full state 128. Events that cause transistion between the states are depicted adjacent to the arrows connecting the states, as before. A legend for the states and transitions of the xfr state machine is shown just below the diagram.

A request state machine for the Network side output ports is shown in FIG. 16, comprising an IdleOut state 130 and a req-out state 132. "Output-islast" is the current output register's reglast bit. On the last xfr of a transaction, if both registers are full, the logic stays in req-out state 132, and another transaction is ready.

The hold output may be produced combinatorially from the state of the data buffers and the xfr machine as follows:

Hold=(full+*xfr*)*

The value of hold is a "don't care" on the last xfr of a message. If hold delays the last xfr, it must go low for at least one cycle to permit it to occur.

Figure 17:
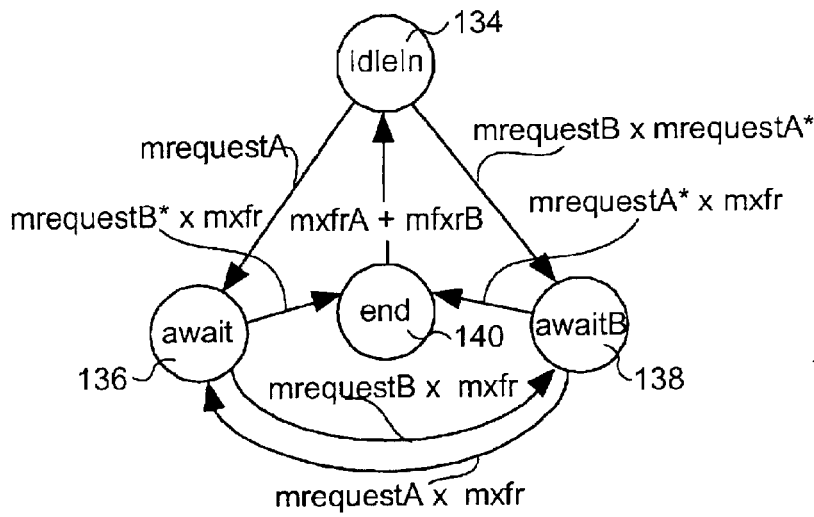
FIG. 17 is a state machine diagram for an mrequest machine for a system side output port for a MAC Bus Out Message Multiplexor that interfaces to two network blocks.
Figure 18:
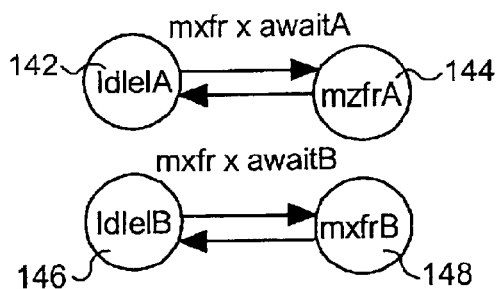
FIG. 18 is a state machine diagram for an mxfr machine for A and B network side input ports.

State machine logic diagrams for a MAC Bus Out message Mux that interfaces to two Network I/O ports are shown in FIGS. 17 and 18. FIG. 17 depicts an mrequest state machine for a System side output port, which includes an IdleIn state 134, an awaitA state 136, an awaitB state 138, and an end state 140. FIG. 18 shows mxfr state machine diagram for the A and B Network side input port, wherein the A input port states include an IdleA state 142, and an mxfrA state 144, and the B input port states include and idleB state 146 and an mxfrB state 148. Events that cause transitions between the state are shown adjacent to the arrows in the Figures.

Figure 19:
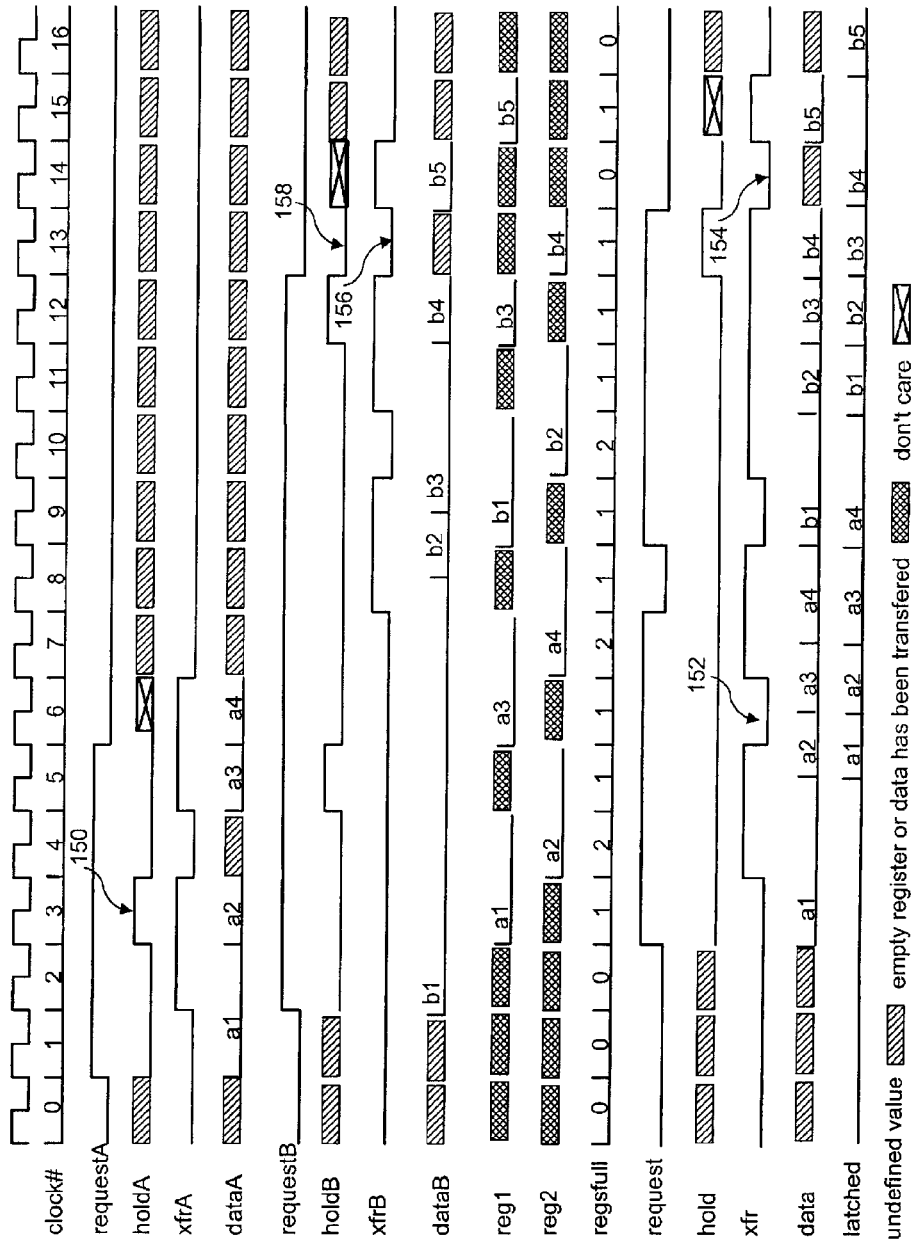
FIG. 19 is a timing diagram corresponding the MAC Bus In Data multiplexor during an exemplary pair of data transfers from respective network side blocks to a system side block.

An exemplary timing diagram corresponding to MAC Bus In Data Mux 54 is shown in FIG. 19. As illustrated, request and data signals are asserted at the rising edge of a clock cycle, and corresponding xfr signals are asserted at the rising edge of the subsequent clock cycle. The timing diagram of FIG. 19 illustrates several timing conditions corresponding to a transfer of data from Network side blocks A and B. When holdA is asserted at a point 150, it has no effect, since the registers reg1 and reg2 were filled by a current xfr. At a point 152, an xfr is permitted, but the receiver abstains. A hold at a point 154 causes xfrB to become low at a point 156, while holdB must go low at a point 158 to permit the last transfer of the packet to occur.

In the exemplary timing diagram of FIG. 19 data from Network Side block A is received by System Side block 56 prior to receiving data from Network Side block B. In addition to this timing, other timing configurations may also be implemented, wherein the logic may be designed such that a short set of data packets might interrupt a longer set of data packets.

Figure 20:
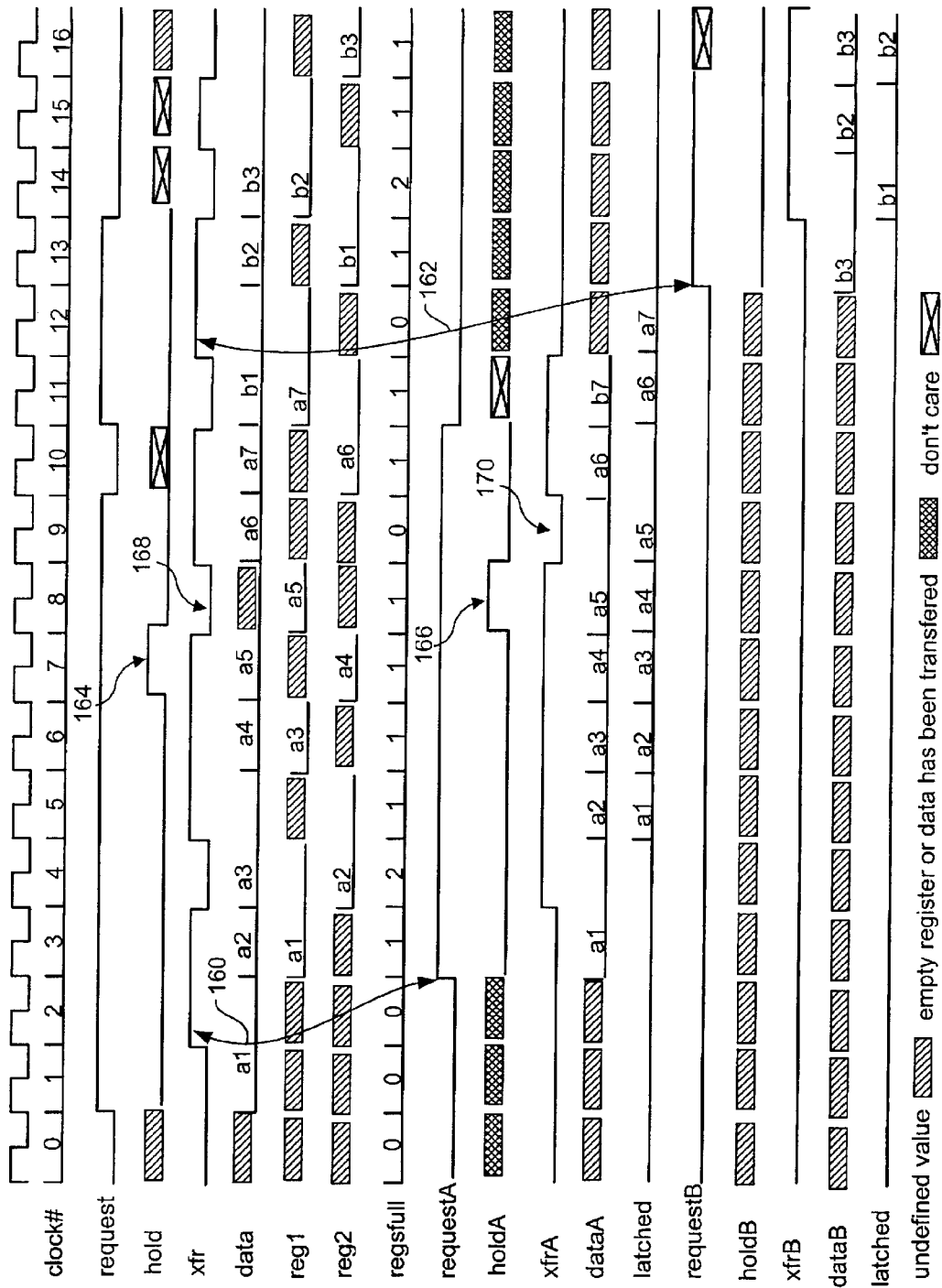
FIG. 20 is a timing diagram corresponding to an operation of the MAC Bus Out Data multiplexor during an exemplary transfer of a pair of data transfers from a system side block to a respective network side blocks.

A similar exemplary timing diagram corresponding to Mac Bus Out Data Mux 76 is shown in FIG. 20. This diagram corresponds to a system side block sending a set of data packets to Network side blocks A and B in sequence. As discussed above, the header word of a set of data packets contains information concerning what port and channel the message needs to be routed to. This information is read in by control 59, which then routes the data packets to an appropriate Network side port and channel, as indicated by 160 and 162. In addition, asserting a hold at a point 164 during a first timing cycle causes holdA to be asserted at the next (second) timing cycle (166), and causes xfr to be low (168) during the second timing cycle. The assertion of holdA at 168 causes xfrA to be low (170) during a third timing cycle.

Figure 21:
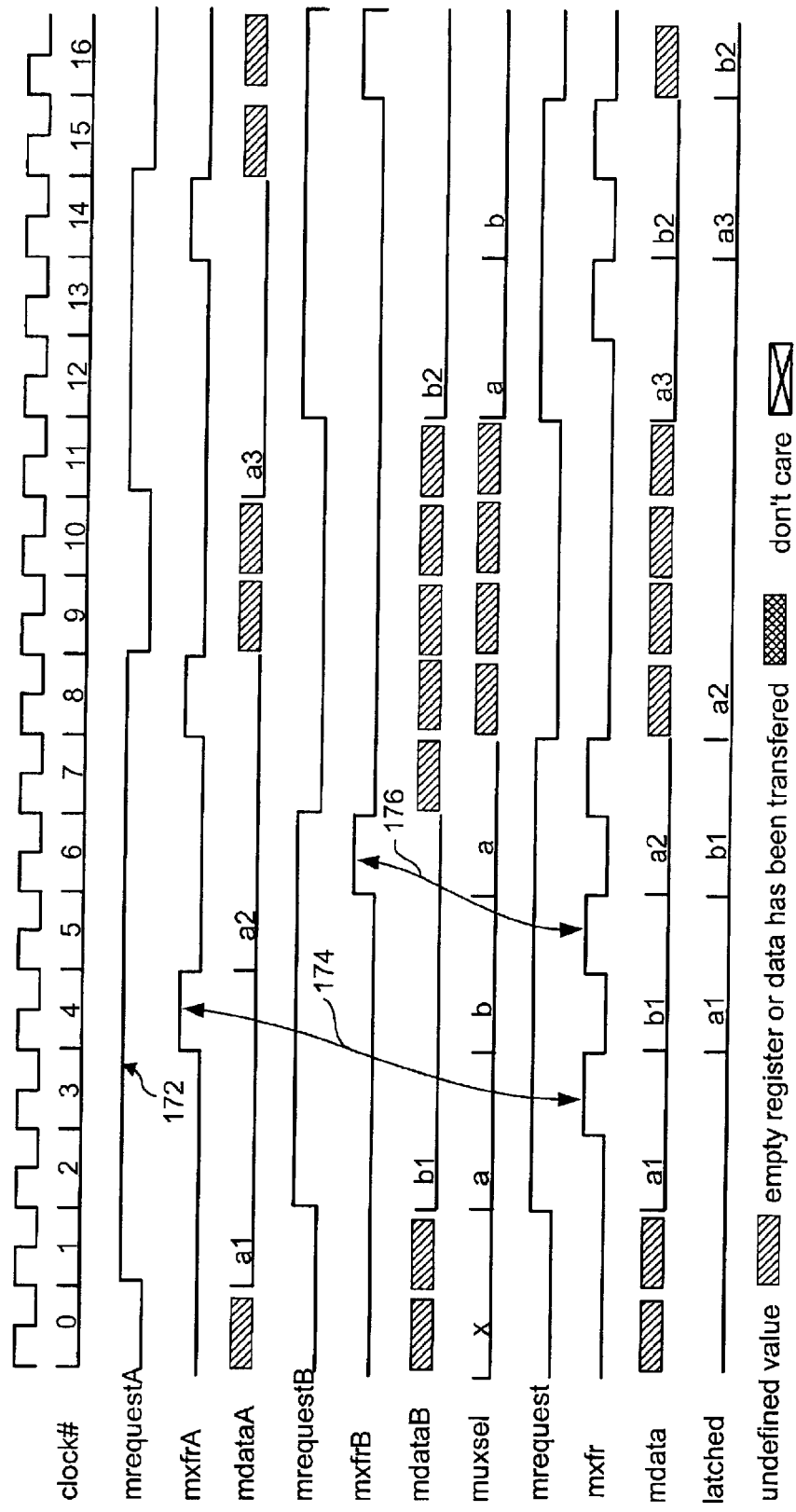
FIG. 21 is a timing diagram corresponding to an operation of the MAC Bus Out Message multiplexor during an exemplary transfer of message data between two network side blocks and a system side block.

FIG. 21 shows an exemplary timing diagram corresponding to Mac Bus Out Message Mux 96. As discussed above, MAC Bus Out Messages are a single word in length, and do not include the use of a hold signal. As a result, mrequest does not have to be removed at a point 172. Also illustrated are the one-cycle delays to mxfrA and mxfrB signals in response to asserting mxfr, as indicted by 174 and 176.

In the foregoing timing diagrams, data is transferred sequentially based on an order in which data sending requests were issued by Network side blocks A and B. As discussed above, several multiplexors may be cascaded to enable communication between a single System side block and four or more network side blocks. In addition, the configurations shown and discussed above for MAC bus multiplexors 54, 76, and 96 are exemplary instances of 2-to-1 multiplexing. As will be recognized by those skilled in the art, many-to-one (e.g., 3-to-1, 4-to 1) may be also be implemented. Accordingly, when a multiplexer receives multiple data transfer requests, the request will need to be serviced in some order or prioritization. Preferably, these requests should be service using a round robin prioritization scheme, although other prioritization schemes may also be employed.

The above description of illustrated embodiments of the invention is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize. Accordingly, it is not intended that the scope of the invention in any way be limited by the above description, but instead be determined entirely by reference to the claims that follow.

What is claimed is:

1. A Media Access Control (MAC) bus interface that enables communication between a network side block and a system side block, comprising;
   a data out bus that enables data to be transferred from the system side block to the network side block comprising a first data bus and a first set of handshake signals;
   an out message bus that enables data transfer control messages to be transferred from the network side block to the system side block comprising a second data bus and a second set of handshake signals; and
   a data in bus that enables data to be transferred from the network side block to the system side block comprising a third data bus and a third set of handshake signals.

2. The MAC bus interface of claim 1, wherein the first set of handshake signals corresponding to the data out bus comprise:
   a request signal sent from the system side block to the network side block that is used to request a transfer of data to the network side block;
   a transfer ready signal from the network side block to the system side block that is asserted by the network side block to inform the system side block that the network side block has accepted a portion of data presented by the system side block for transfer; and
   a hold signal issued sent from the system side block to the network side block that may be asserted to control a timing of the transfer of data.

3. The MAC bus interface of claim 1, wherein the second set of handshake signals corresponding to the out message bus comprise:
   a message request signal from the network side block to the system side block that is used to request a transfer of the message data from the network side block to the system side block; and
   a message transfer ready signal asserted by the system side block to inform the network side block that the message data may be received by the system side block system side block has accepted a portion of data presented by the network side block for transfer.

4. The MAC bus interface of claim 1, wherein the third set of handshake signals corresponding to the data in bus comprise:
   a request signal sent from the network side block to the system side block that is used to request a transfer of data to the system side block;
   a transfer ready signal sent from the system side block to the network side block that is asserted by the system side block to inform the network side block that the system side block is ready to receive data has accepted a portion of data presented by the network side block for transfer; and
   a hold signal issued from the network side block to the system side block that may be asserted to control a timing of the transfer of data.

5. The MAC bus interface of claim 1, further comprising at least one bus multiplexor that enables a system side block to communicate with at least two network side blocks.

6. The MAC us interface of claim 5, comprising at least one set of cascaded multiplexors that enable a system side block to communicate with at least four network side blocks.

7. A Media Access Control (MAC) interface multiplexor for multiplexing communication signals between a system side block and at least two network side blocks, comprising:
   a first multiplexor that provides multiplexing of a data out bus that enables a transfer of data from the system side block to said at least two network side blocks in response to a first set of handshaking signals received by the first multiplexor;
   a second multiplexor that provides multiplexing of a data in bus that enables a transfer of data from said at least two network side blocks to the system side block in response to a second set of handshaking signals received by the second multiplexor; and
   a third multiplexor that provides multiplexing of a message out data bus that enables a transfer of message data from the system side block to said at least two network side blocks in response to a third set of handshaking signals received by the third multiplexor, said message data specifying data format information corresponding to a network side block that issues the message data.

8. The MAC multiplexor of claim 7, wherein the first multiplexor comprises:
   a first and second data buffer, each having a first output and an input connected to a system side portion of the data out bus enabling the data buffers to receive data from a system side block;
   a first multiplexor, connected to the first outputs of each of the first and second data buffers and having an output connected to a first network side portion of the data out bus to which a first network side block is connected;
   a second multiplexor, having an input connected to the first outputs of each of the first and second data buffers and having an output connected to a second network side portion of the data out bus to which a second network side block is connected; and
   a control, providing respective control signals to each of the first and second data buffers and each of the first an second multiplexors, said control producing said respective control signals in response to handshaking signals it receives from the first and second network side block and the system side block.

9. The MAC multiplexor of claim 8, wherein each of the first and second data buffers have a second output connected to the control through which network routing information is passed to the control.

10. The MAC multiplexor of claim 7, wherein the second multiplexor comprises:
   a first multiplexor, having an output and an input connected to first and second network side portions of the data in bus that enable the first multiplexor to receive data from first and second network side blocks;
   a first and second data buffer, each having an input connected to the output of the first multiplexor and an output;
   a second multiplexor, having an input connected to the output of each of the first and second data buffers and having an output connected to network side portion of the data in bus to which a system side block is connected; and
   a control, providing respective control signals to each of the first and second data buffers and each of the first and second multiplexors, said control producing said respective control signals in response to handshaking signals it receives from the first and second network side blocks and the system side block.

11. The MAC multiplexor of claim 7, wherein the third multiplexor comprises:
   a multiplexor, having an output and an input connected to first and second network side portions of the data in bus that enable the first multiplexor to receive message data from first and second network side blocks and having an output connected to network side portion of the data in bus to which a system side block is connected; and a control, providing control signals to the multiplexor in response to handshaking signals it receives from the first and second network side blocks and the system side block.

12. The MAC multiplexor of claim 7, wherein the first, second, and third multiplexors share a signal control the controls a flow of data through each of the multiplexors in response to control signals the control receives from a first and second network side block and a system side block.

13. The MAC multiplexor of claim 7, wherein the control multiplexes handshake signals it receives from the system side block and sends the handshake signals to an appropriate network side blocks from among said at least two network side blocks.

14. The MAC multiplexor of claim 7, wherein the control multiplexes handshake signals it receives from said at least two network side blocks and forwards the handshake signals to the system side block.

15. A method of transferring data across a Media Access Control (MAC) interface, comprising:

sending outbound data from a sending side block to a receiving side block;

asserting a data transfer request signal from the sending side block;

issuing a transfer signal from the receiving side block to the sending side block to inform the sending side block that the receiving side block is latching the outbound data;

sending transfer message data from the receiving side block to the sending side block;

asserting a transfer message data request signal from the receiving side block to the sending side block; and issuing a transfer message data transfer signal from the sending side block to the receiving side block to inform the receiving side block that the sending side block is latching the transfer message data.

16. The method of claim 15, wherein the receiving side block comprises a system side block and the sending side block comprises a network side block.

17. The method of claim 15, wherein the transfer message data includes formatting information corresponding to data format requirements for sending data to the network side block.

18. The method of claim 17, further comprising:

embedding routing information in the outbound data; and routing the outbound data to an appropriate network side block based on the routing information.

19. The method of claim 17, further comprising multiplexing the outbound data and transfer message data so that data may be transferred from the system side block to a particular network side block that is selected from among a plurality of network side blocks.

20. The method of claim 15, wherein a first word of the outbound data and the data transfer request signal are sent at substantially the same time.

21. The method of claim 15, wherein a word of the transfer message data and the transfer message data request signal are sent at substantially the same time.

22. The method of claim 15, further comprising:

enabling the sending side block to assert a hold signal to inform the receiving side that additional outbound data is not presently ready to be sent.

* * * * *